Dec. 11, 1962 R. G. FISHER ET AL 3,068,480
DISC MEMORY ASSEMBLY
Filed Oct. 6, 1958
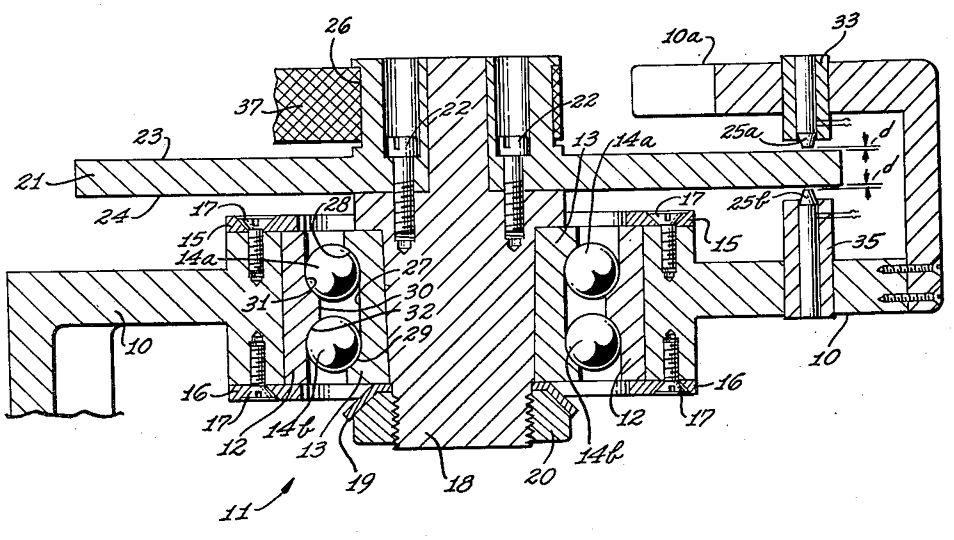
INVENTORS:
Richard G. Fisher
Dan H. Jones
By Louis A Kline
John T. Matlago
Their Attorneys United States Patent Office 3,068,480

Patented Dec. 11, 1962

3,068,480

DISC MEMORY ASSEMBLY

Richard G. Fisher, Torrance, and Dan H. Jones, Redondo Beach, Calif., assignors to The National Cash Register Company, Dayton, Ohio, a corporation of Maryland Filed Oct. 6, 1958, Ser. No. 765,440
3 Claims. (Cl. 346—74)

This invention relates to mounting mechanisms for magnetic storage memory of the rotary plate or disc type.

A disc memory generally comprises a disc mounted on a rotatable shaft so that the disc may rotate in either a vertical or a horizontal plane. The disc is usually of non-magnetic material with a coating of magnetizable material having two stable remanent states, the coating being disposed on either one or both faces. For recording information on and reading information from the disc, one or more magnetic heads are stationed near each face. For maximum resolution and uniformity of recording, it is desirable to have the head as close to the recording surface as possible, without actually touching, and to maintain the separation to be as constant as possible. Physical variations in the separation produce unwanted modulation of the signal. The elimination of such unwanted modulation, or noise, demands the provision of further electronic circuits above and beyond what would be required if the modulation noise were not present. This complicates the design, construction, and maintenance of the electronic circuits and of course increases the cost. The smaller the separation is between the head and the recording surface, the greater is the resolution of the recording, i.e., the greater is the number of pulses which may be recorded per unit length of record track. Hence it is important and desirable to have the separation as small as possible. However, the effect of a given amount of variation in the separation of head and disc surface increases as the actual separation decreases, i.e., the percentage of modulation increases. This is a consequence of the "square of the distance" rule in magnetics.

One of the difficulties involved hitherto in the use of disc memories has been the failure to maintain a satisfactorily constant and small separation of the head and the recording surface as the disc rotates, without the use of expensive and complicated bearings and mountings. This difficulty may be at least partially overcome by employing a "floating" head, i.e., one which moves normally to the disc surface so as to maintain the head a constant distance from the surface as the disc rotates. Such a head may, for example, be spring loaded so as to force it towards the disc, but prevented from touching the disc by means of an outward flow of air maintained between the head and the disc. Such arrangements are still quite complicated and so expensive as to be prohibitive in certain systems where a small, simple memory device is needed.

Another previously encountered difficulty has been the control of radial variations within tolerable limits. This problem has been particularly aggravating in drum memories, where the recording surface lies on the cylindrical periphery of the drum. The apparatus of the present invention is such that the effects of radial variations on the desired operation of the disc memory provided are negligible.

The present invention contemplates the use of a cantilever type of support for the disc memory. That is to say, the disc is mounted on a shaft, and the bearing members for the shaft are mounted thereon on one side only of the disc. This obviates the usual practice of having separate bearings, one on each side of the disc, and therefore simplifies the problem of mounting since the alignment of separate bearings so disposed, to obtain the tolerances required, is difficult and expensive. With the apparatus of the present invention, the desired stability of the shaft is obtained by means of a single bearing disposed at one side of the disc.

One object of this invention therefore is the provision of a mounting mechanism for a disc memory which will permit the use of a normally-fixed, i.e., non-floating, head and which will maintain a highly constant and small separation of the head and the recording surface. It is also an object of this invention to provide such a mechanism in an improved, simplified, and inexpensive form using a minimum number of parts. These and other objects of the invention will become apparent from the following description taken in conjunction with the accompanying drawing which shows a sectional view in elevation of a preferred embodiment of the invention, comprising a disc memory and a mounting mechanism therefor.

In the drawing, 10 denotes a supporting base plate, a suitable material for which is aluminum, in which is mounted a double-row angular-contact internally preloaded bearing 11. Bearing 11 comprises an outer race 12, an inner race 13, and upper and lower sets or rows of balls **14*a* and 14*b*, respectively. Outer race 12 is securely mounted in a closely fitted opening provided in base plate 10, and is clamped firmly thereto by rings 15 and 16 which are fixed to base plate 10 by screws 17, as indicated. A shaft or axle 18 has a close fit in inner race 13 and is rigidly secured thereto by means of a lock washer 19 and a lock nut 20, so that the axis of shaft 18 coincides with the axis of rotation of inner race 13. A disc memory 21 is rigidly fixed to shaft 18 by means of bolts 22**.

Disc memory 21 is preferably made of aluminum or brass, and has a thin coating of magnetizable material on its upper face 23 and may also have a similar coating on the lower face 24. Magnetic heads **25*a* and 25*b* for recording information on disc memory 21, or abstracting information therefrom, are shown disposed on either side of memory 21. Head 25*a* is maintained at a distance $d$ from surface 23 of disc memory 21 by means of its mounting device 33 which is securely held in an opening provided in a sector bracket 10*a* secured to base plate 10 with screws as indicated. Head 25*b* is maintained at the same distance $d$ from surface 24 of disc memory 21 by means of its mounting device 35 which is held in an opening provided in base plate 10**.

Rotation is imparted to shaft 18 and disc memory 21 by applying a belt drive or other form of flexible coupling to the central pulley-shaped portion 26 of disc memory 21. For example, a motor driven flexible belt 37 may operate upon portion 26 of the rotary structure. It should be noted that it would be highly undesirable to apply rigid direct drive to shaft 18 because of the axial rigidity of the shaft and shaft-supported structure when supported in a preloaded bearing.

In prior disc memory assemblies, unless expensive mounts requiring close tolerance machining and assembly techniques are utilized, the desired clearance $d$ will vary as disc memory 21 rotates, producing undesirable effects in the recording or reading operations. The greater the variations of $d$, the less will be the quality of the performance. The apparatus of the present invention enables the variation of $d$ to be kept to extremely small values, while obviating the necessity of expensive bearings and supports. This is achieved by limiting the number of bearings to one of the type illustrated. The outer wall of inner race 13 contains a broad flat groove or raceway 27 which is internally rounded at the upper and lower peripheries 28 and 29, respectively, to accommodate the upper and the lower rows of balls **14*a* and 14*b*, respectively. The opposing inner wall of outer race 12** is centrally broadly thickened or elevated, as shown at 30, the upper and the lower peripheries 31 and 32, respectively, of the elevation being rounded so as to accommodate the upper and the lower rows of balls, respectively, in diametrically opposing relationship to the curved peripheries 28 and 29, respectively. The construction of bearing 11 is such that the upper row of balls 14*a* is very strongly compressed between the opposing curved peripheries 28 and 31, and the lower row of balls 14*b* is similarly very strongly compressed between the opposing curved peripheries 29 and 32. The bearing is thus said to be preloaded. Such preloaded bearings are well known and commercially available. The result of the strong compressive forces between inner race 13 and outer race 12 is that the axis of rotation of inner race 13 is maintained substantially in coincidence with the axis of outer race 12 for a wide range of loads which may be applied to inner race 13, and this is so regardless of whether bearing 11 is operated vertically or horizontally or otherwise. The actual degree of coincidence maintained between the axis of rotation of inner race 13 and the axis of the outer race 12 depends on the grade of bearing 11. Even with one of the cheapest commercially available standard grade of bearing, such as A.B.E.C. Specification No. 1, the eccentricity of the bearing is only 0.001 inch. Therefore, even if outer race 12 precesses or creeps in base plate 10, the wander of the axis of rotation of inner race 13 will not produce more than 0.001 inch of radial variation in record tracks on surfaces 23 and 24 of disc 21. Since a track recorded by head 25*a* or by head 25*b* has a radial dimension or width of the order of 0.1 inch, a radial variation of 0.001 inch is negligible. Bearings having better tolerances in radial deflection are, of course, available. For example, the bearing of A.B.E.C. Specification No. 5 has an eccentricity of only 0.0003 inch, but the machining costs of this bearing are several times greater than those of the No. 1 bearing. It is therefore seen that the cheapest grade of double-row angular-contact internally preloaded bearing may be used in the invention without having to give consideration to radial variations.

Surfaces 23 and 24 of disc memory 21 are machined so as to be perpendicular to the axis of rotation of inner race 13. The length of shaft 18 is kept to a minimum. With such a construction and with the very light load of the single disc, the variation of $d$ is approximately only 0.00002 inch (two one-hundred-thousandths of an inch) or less, with a disc diameter of six inches at an angular speed of 900 r.p.m. With an initial $d=0.0005$ inch (one-half mil) setting or clearance, e.g., between the head and the disc surface, the percentage variation or modulation due to the possible variation of $d$ on the order described above is only about four percent, which represents a high degree of excellence of performance for magnetic signal reading or recording.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Magnetic recording apparatus comprising, in combination: an annular magnetic memory member having at least one transducing surface, magnetic head means to be disposed in accurate close proximity to the transducing surface of said magnetic memory member for performing transducing operations in cooperation therewith as said magnetic memory member rotates, the construction, arrangement, and operation of said magnetic memory member and said magnetic head means being such that rotation of said magnetic memory member about a predetermined axis is required with a minimum of eccentricity and radial deviation in order to permit said magnetic head means to be maintained at a fixed precise close distance of less than .0025 inch with respect to said transducing surface as said magnetic memory member rotates, and means for mounting and rotating said magnetic memory member with relation to said magnetic head means so as to provide the required minimum of eccentricity and radial deviation, said means for mounting and rotating comprising a relatively rigid support means having a bearing seat therein, an axle to which said magnetic memory member is coaxially mounted, means mounting said shaft for rotation consisting solely of a single double-row angular-contact internally preloaded bearing whose outer race is fixedly fitted in said bearing seat and whose inner race is fixedly secured to said axle, flexible means coupled to said axle for imparting rotation thereto, and means mounting said magnetic head means in a fixed rigid relationship with respect to said rigid support means so as to be maintained at a precise close distance of less than .0025 inch from said transducing surface when said magnetic memory member is caused to rotate by said flexible means imparting rotation to said axle.

2. Magnetic recording apparatus comprising, in combination: a magnetic memory disc having at least one transducing surface, magnetic head means to be disposed in accurate close proximity to the transducing surface of said magnetic disc for performing transducing operations in cooperation therewith as said magnetic disc rotates, the construction, arrangement, and operation of said magnetic disc and said magnetic head means being such that rotation of said magnetic disc about its axis is required with a minimum of eccentricity and radial deviation in order to permit said magnetic head means to be maintained at a fixed precise close distance of less than .0025 inch with respect to said transducing surface as said magnetic disc rotates, and means for mounting and rotating said magnetic disc with relation to said magnetic head means so as to provide the required minimum of ecccentricity and radial deviation, said means for mounting and rotating comprising a relatively rigid support means having a bearing seat therein, an axle to which said magnetic disc is coaxialy mounted, means mounting said shaft for rotation consisting solely of a single double-row angular-contact internally preloaded bearing whose outer race is fixedly fitted in said bearing seat and whose inner race is fixedly secured to said axle, flexible means coupled to said axle for imparting rotation thereto, and means mounting said magnetic head means in a fixed rigid relationship with respect to said rigid support means so as to be maintained at a precise close distance of less than .0025 inch from said transducing surface when said magnetic disc is caused to rotate by said flexible means imparting rotation to said axle.

3. Magnetic recording apparatus comprising, in combination: a supporting base plate; a single double-row angular-contact internally preloaded bearing having an inner race and an outer race, said outer race being securely mounted in a closely fitted opening in said base plate; a relatively short stub axle having first and second ends, said axle being fixedly secured in said inner race closely adjacent the second end thereof with the axis of rotation of said axle coinciding with the axis of rotation of said inner race; a disc memory having a thin coating of magnetizable material on at least one face thereof, said disc memory being rigidly secured coaxial with said axle at the first end thereof, the face of said disc memory on which said thin coating of magnetizable material is provided being machined perpendicular to the axis of rotation of said inner race; at least one magnetic head; means mounted to said base plate for supporting said head at a precise close distance of less than .0025 inch from the face of said disc memory on which said thin coating of magnetizable material is provided; and flexible means for imparting rotation to said axle.

(References on following page)

References Cited in the file of this patent

UNITED STATES PATENTS

| | | |
|---|---|---|
| 850,036 | Morin | Apr. 9, 1907 |
| 897,765 | Morin | Sept. 1, 1908 |
| 1,703,380 | Beemer | Feb. 26, 1929 |
| 1,956,305 | Baninger | Apr. 24, 1934 |
| 2,103,912 | Montgomery | Dec. 28, 1937 |
| 2,114,911 | Burt | Apr. 19, 1938 |
| 2,310,357 | Edelman | Feb. 9, 1943 |
| 2,617,705 | Coombs | Nov. 11, 1952 |
| 2,662,804 | Hutton | Dec. 15, 1953 |
| 2,683,254 | Anderson et al. | July 6, 1954 |
| 2,694,192 | Dean | Nov. 9, 1954 |
| 2,737,646 | Muffly | Mar. 6, 1956 |
| 2,899,260 | Farrand | Aug. 11, 1959 |
| 2,908,541 | Fomenko | Oct. 13, 1959 |
| 2,950,353 | Fomenko | Aug. 23, 1960 |

OTHER REFERENCES

Typical Anti-Friction Bearing Mountings, Product Engineering, May 1933, page 178.